J. VIEIRA.
SOIL PULVERIZER.
APPLICATION FILED AUG. 4, 1913.

1,112,499.

Patented Oct. 6, 1914.

Witnesses

Inventor
J. Vieira
by Attorneys

UNITED STATES PATENT OFFICE.

JOSEPH VIEIRA, OF ARCATA, CALIFORNIA.

SOIL-PULVERIZER.

1,112,499.  Specification of Letters Patent.  Patented Oct. 6, 1914.

Application filed August 4, 1913. Serial No. 782,982.

*To all whom it may concern:*

Be it known that I, JOSEPH VIEIRA, a citizen of the United States, residing at Arcata, in the county of Humboldt and State of California, have invented a new and useful Soil-Pulverizer, of which the following is a specification.

The present invention appertains generally to earth tilling implements, and aims to provide a novel and improved implement of that character for pulverizing the soil or for mashing or disintegrating the clods or lumps of earth.

It is the object of the present invention to provide a novel and improved soil pulverizer of comparatively simple, substantial, durable and inexpensive construction, which shall be serviceable, convenient and efficient in its use.

It is also the object of the present invention to provide a device of the nature indicated which shall be adjustable to pulverize the soil to various depths and to pulverize the soil to various grades or degrees of fineness.

With the foregoing and other objects in view which will be apparent as the description proceeds, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawing, wherein:—

Figure 1:
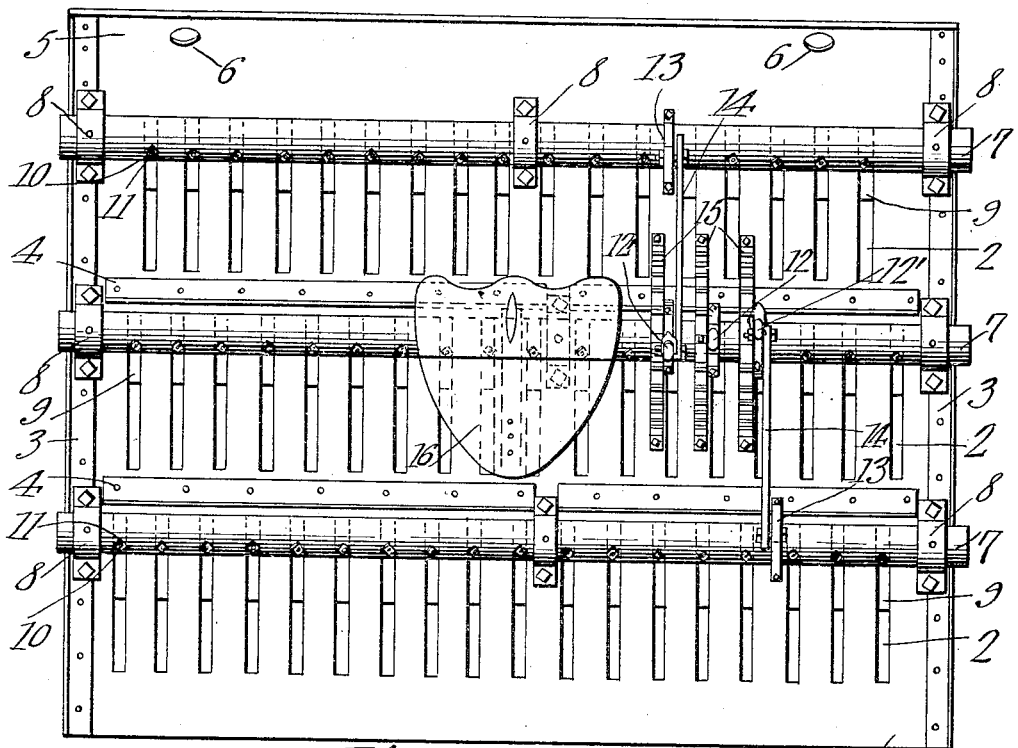
Figure 2:
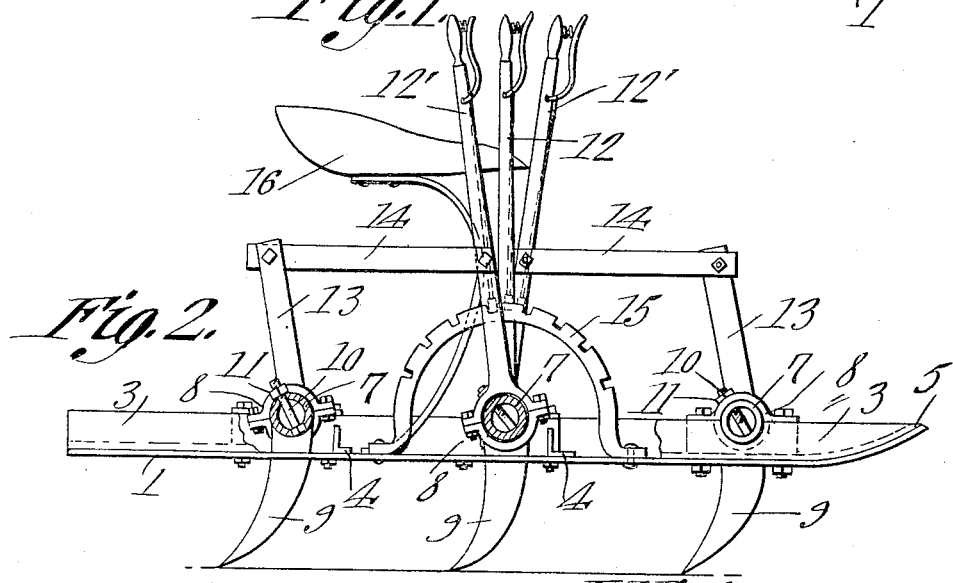

Figure 1 is a plan view of the improved device. Fig. 2 is a side elevation thereof, parts being broken away.

In carrying out the invention, reference being had in detail to the drawing, there is provided a rectangular sheet metal plate 1, which has a plurality of transverse series of longitudinal slots 2, in this case three. Angle iron sills 3 are secured upon the side edges of the plate 1, and transverse angle iron members 4 are secured upon the plate 1 intermediate the respective rows of slots 2. The angle iron members 3 and 4 are designed to both strengthen and increase the weight of the plate 1. The forward edge 5 of the plate 1 is deflected or bent upwardly slightly, in order that the plate will be in the form of a sled, openings 6 being provided in the plate adjoining the forward edge for the attachment of draft animals for drawing the device about.

A plurality of rocking shafts 7, in this case three, one for each row of slots 2, are journaled upon the plate 1, end and intermediate bearings 8 being secured on the plate 1 and embracing the respective shafts 7. The respective shafts 7 are disposed adjoining the forward ends of the respective slots 2. The shafts 7 are preferably tubular, the same being constructed of gas pipe or other suitable stock, and suitable oil cups are preferably provided for the respective bearings 8.

A series of knives or blades 9 are secured to each of the shafts 7, the knives or cutters being semi-crescent shaped and having their butt ends curved to conform to the curvature of the shaft 7. The knives or blades 9 are also provided at their butt ends with the shanks or stems 10 engaging diametrically through the shaft 7 and bearing nuts 11 at their free ends to clamp the knives in position. The lower portions of the shanks 10 are preferably square or non-circular in cross section, and the lower openings of the shafts 7 are also preferably square or non-circular in order that the shanks 10 will be locked against rotation in a most effective manner. The knives or blades 9 are adapted to pass through the respective slots 2, the knives as well as the slots of the respective series or sets being offset with respect to each other, so that the blades and slots of each series will not be in alinement with either of the other series.

A hand lever 12 is attached rigidly to the central or intermediate shaft 7, while similar hand levers 12' are pivoted or engaged loosely to the intermediate shaft, the several levers being disposed slightly to one side of the center of the plate 1. The upstanding arms 13 are attached rigidly to the front and rear shafts 7, and have their free ends connected to the respective hand levers 12' by the links 14. Segments 15 are secured upon the plate 1 to coöperate with the respective levers 12 and 12', the levers carrying suitable pawls or dogs for engaging the respective segments. It will be observed that the segments will permit the levers to be locked at various angles or adjusted positions.

A suitable seat 16 for the operator is mounted centrally upon the plate 1, the levers 12 and 12' being preferably disposed slightly to the right of the seat 16 where they may be conveniently manipulated by the right hand of the operator.

The present device is designed particularly for use on marshy or stoneless land, it being observed that by swinging the hand levers properly, the blades or cutters 9 may be swung completely above the plate 1, so that the plate may be drawn over the soil or underlying surface in the manner of a sled. In this manner, the device may be drawn from one locality to the other, or over stony ground. By swinging the hand levers properly, the blades or cutters 9 may be swung or projected through the respective slots 2 so as to engage the soil, it being observed that the blades may be projected to any suitable distance below the plate 1 within the limit of the lengths of the blades, so as to embed within the soil to a requisite depth. It is also to be noted that the respective shafts may be swung independently, so that any one or more of the sets of blades may be brought into operation. Thus, when all of the blades are brought into operation, the soil will be very finely pulverized, while if only one or two of the sets of blades are brought into operation, the soil will be less finely pulverized. By thus manipulating the respective shafts 7, the soil may be pulverized as desired, either to various depths or to various degrees or grades of fineness. When the device is being drawn over the soil being pulverized, it will be observed that the blades in engaging the clods or lumps of earth will cut or sever the same, the plate 1 preventing the clods or lumps from being brushed aside, and thus serving to pulverize the clods or lumps in connection with the blades. In this manner, the clods or lumps of earth will be effectively and positively pulverized or mashed.

Having thus described the invention, what is claimed as new is:—

1. In a device of the character described, a plate having a plurality of transverse series of longitudinal slots, the slots of the respective series being offset with respect to each other, shafts journaled on the plate at the forward ends of the respective slots, blades secured to the respective shafts and adapted to be swung completely through the slots, a plurality of hand levers carried by one shaft, means connecting the levers and several shafts, and independent means for locking each of the levers at various angular positions.

2. In a device of the class described, a plate having a plurality of transverse series of longitudinal slots, shafts journaled on the plate over the respective slots, semi-crescent shaped blades secured to the respective shafts and adapted to be swung completely through the slots, and means for independently actuating the shafts.

In testimony that I claim the foregoing as my own, I have hereto affixed my signature in the presence of two witnesses.

JOSEPH VIEIRA.

Witnesses:
T. F. ZIEGLER,
J. J. CAIRNS.

---

Copies of this patent may be obtained for five cents each, by addressing the "Commissioner of Patents, Washington, D. C."